Fig.2

May 1, 1951 L. W. WATERS 2,551,076
PEACH PITTER
Filed Aug. 6, 1948 7 Sheets-Sheet 4

INVENTOR
LAWRENCE W. WATERS
BY
Mellin and Hanscom
ATTORNEYS

May 1, 1951  L. W. WATERS  2,551,076
PEACH PITTER

Filed Aug. 6, 1948  7 Sheets-Sheet 5

INVENTOR
LAWRENCE W. WATERS
BY
Mellin and Hanscom
ATTORNEYS

May 1, 1951 L. W. WATERS 2,551,076
PEACH PITTER
Filed Aug. 6, 1948 7 Sheets-Sheet 7

INVENTOR
LAWRENCE W. WATERS
BY
Mellin and Hanscom
ATTORNEYS

Patented May 1, 1951

2,551,076

UNITED STATES PATENT OFFICE 2,551,076

PEACH PITTER

Lawrence W. Waters, Ontario, Calif., assignor to Atlas Imperial Diesel Engine Co., Oakland, Calif., a corporation of Delaware Application August 6, 1948, Serial No. 42,770

8 Claims. (Cl. 146—28)

This invention relates to a peach pitter. More particularly, it relates to a machine for removing split pits from halves of peaches.

It frequently happens in peach pitting operations, wherein a peach is split into halves and the meat is separated from the pit, that the pit itself splits into two halves and each half pit remains in a half of the peach. Before further processing such peaches, it is necessary to remove the split pit. This operation can be done manually or by any of several semi-automatic machines, but such pitting is laborious and expensive. Nevertheless, the mechanical removal of split pits from peach halves is difficult and tedious to carry out.

It is an object of this invention to provide a machine which rapidly and efficiently removes split pits from peach halves.

It is a further object of this invention to provide a fully automatic machine which will rapidly scoop out and remove pits from peach halves with a minimum of wastage of the meat of the fruit.

It is a particular object of this invention to provide a machine for removing split pits from peach halves which performs the pitting efficiently and rapidly and which does not deform the fruit.

These and other objects of the invention will be apparent from the ensuing description and the appended claims.

One form which the invention may assume is exemplified in the following description and illustrated by way of example in the accompanying drawings in which.

Figure 1:
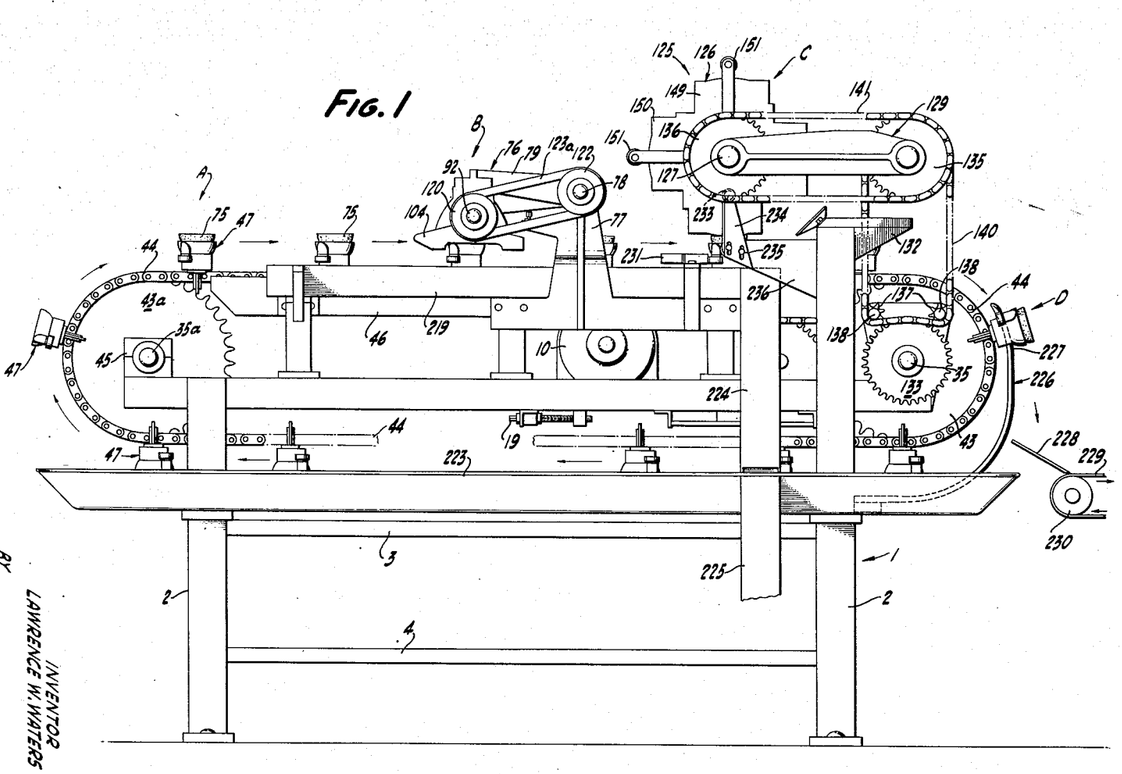
Fig. 1 is a side elevation of the machine.
Figure 2:
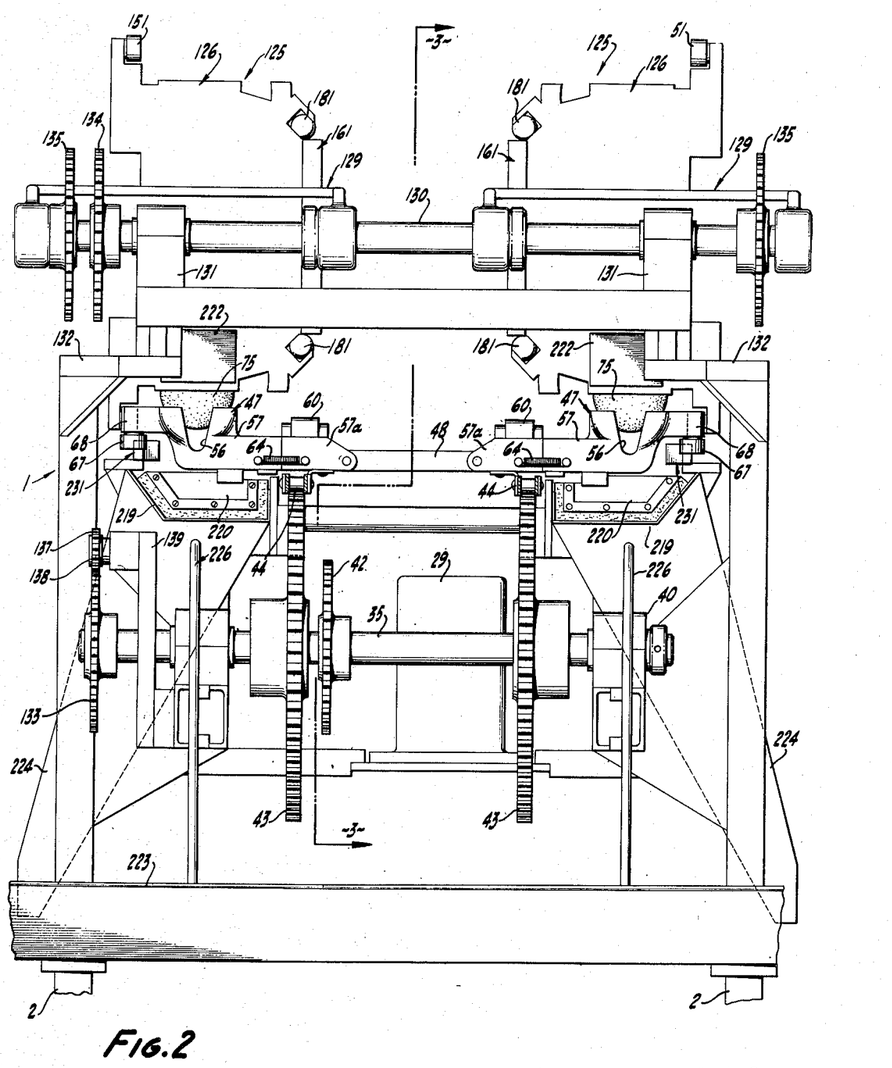
Fig. 2 is an end elevation as viewed from the right-hand end of the machine in Fig. 1.
Figure 3:
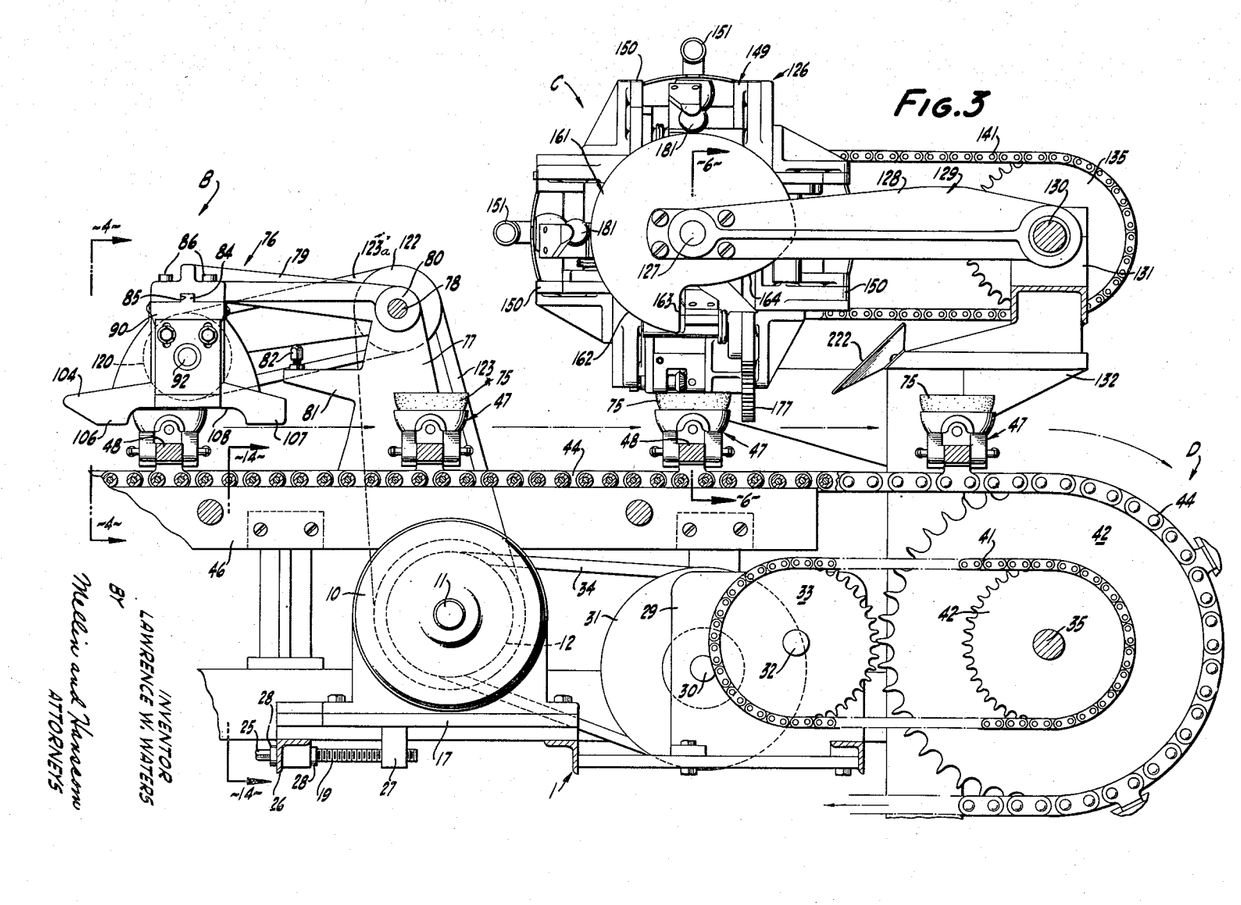
Fig. 3 is a partial longitudinal section through the machine along the line 3—3 of Fig. 2.

Referring now to the drawings and more particularly to Figs. 1, 2 and 3, a main framework 1 is provided including four upright posts 2 and horizontal members 3 and 4, as shown. A loading station is indicated at A at the left or rear end of the machine as viewed in Fig. 1, a topping station at B, a pitting station at C, and an unloading station at D at the extreme right-hand end of the machine.

Figure 14:
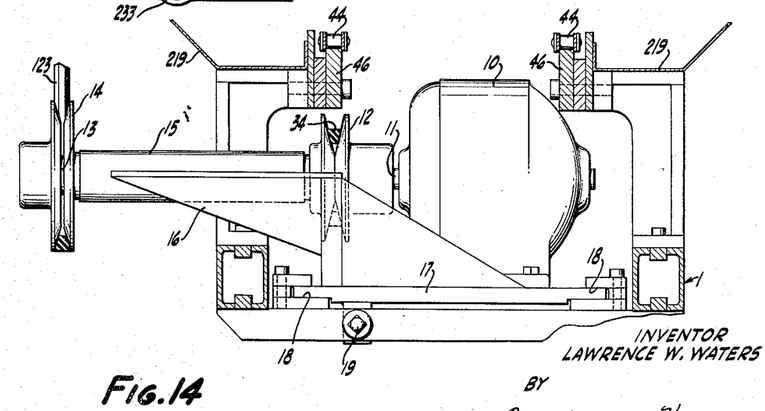
Fig. 14 is a section along the line 14—14 of Fig. 3 showing the motor employed to operate the machine and the adjustable mounting for the same.

Power is provided by means of an electric motor 10 having a shaft 11, a variable pitch pulley 12 secured to the shaft 11, an extension shaft 13 (see Fig. 14) and a pulley 14 secured to the extension shaft 13. The extension shaft 13 is journaled in a sleeve 15 supported by a bracket 16, which in turn is secured to the motor mounting. The motor is mounted upon a slide 17 which rides in trackways 18 bolted to the framework of the machine. A screw 19 having a squared end 25 adapted to engage a tool is provided. The screw 19 passes at one end through an angle beam 26 secured to the machine framework and is in threaded engagement at its other end with a lug 27 depending from the motor slide 17. Nuts 28 serve to retain the screw 19 in adjusted position. By turning the screw 19, the longitudinal position of the motor 10 is adjusted to adjust the effective diameter of the pulley 12 and thus the speed of the machine.

A transmission is also provided comprising a speed reducer 29 bolted to the main framework of the machine and having on one side, a shaft 30 to which is secured a fixed diameter pulley 31 and, on the other side, a shaft 32 to which is secured a sprocket 33. A V-belt 34 is trained about the pulleys 12 and 31. A main conveyor shaft 35 is journaled in bearing blocks 40 secured to the machine framework and is rotated by means of a chain 41 trained about the sprocket 33 and about a sprocket 42 secured to the main conveyor shaft. As shown in Fig. 2, two conveyor sprockets 43 are secured to the main conveyor shaft, each of which engages a conveyor chain 44. At the opposite end of the machine, or at the left as viewed in Fig. 1, similar conveyor sprockets 43a are secured to a second conveyor shaft 35a, which is journaled in bearing blocks 45 secured to the machine framework. A track or guide 46, secured as shown to the machine framework, is provided along the upper course of each conveyor chain 44 to insure proper alignment and to prevent sagging of the chain.

Figure 11:
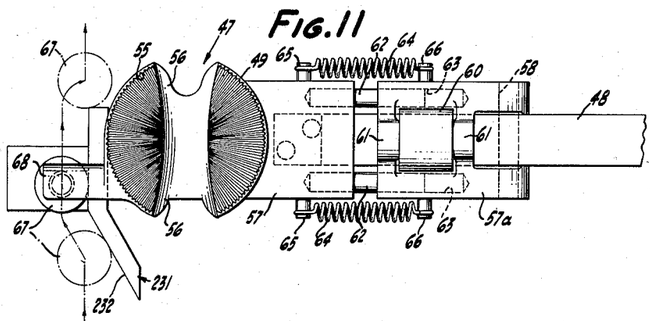
Fig. 11 is a plan view of one of the fruit cups, the mounting therefor and the cam means for moving the fruit cup away from the center line of the machine.
Figure 12:
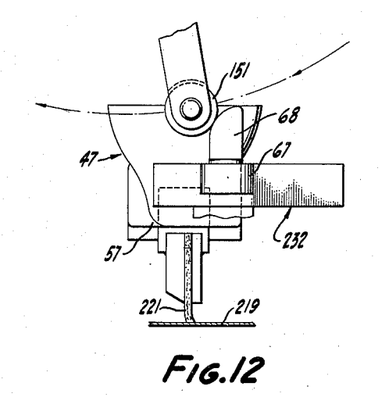
Fig. 12 is an elevational view of one of the fruit cups as viewed from the left of Fig. 11.

A plurality of uniformly spaced fruit conveyors, generally designated as 47, are secured to each of the conveyor chains 44. As shown more clearly in Fig. 2, the fruit conveyors 47 are in pairs and a cross-bar 48 is provided joining the members of each pair. As shown in Figs. 2 and 11, each fruit conveyor comprises a fruit cup 49 having radial grooves 55 formed on its inner surface and provided with a generally V-shaped opening 56 on each side of the cup in longitudinal alignment with the machine, so as to present an open passage through the cup in the direction of movement thereof. The cup mounting comprises two separate sections, i. e., an outer section 57 integral with the cup and an inner section 57a pivotally secured to the cross-bar 48 at 58. The inner section 57a is secured to a link of the conveyor chain 44 by means of a bracket 59 and is provided with a roller 60 journalled in lugs 61 extending upwardly from the inner section. The outer section 57 is secured to the inner section 57a in a manner to allow outward displacement of the fruit cup, by means of pins 62, each fixed at one end in the outer section 57 and slidably received at its other end within a socket 63. A coil spring 64 is disposed on each side of the mounting, being secured at one end to a pin 65 projecting from section 57 and at its other end to a pin 66 secured to the section 57a, the springs 64 serving to yieldably hold the inner and outer sections of the fruit cup mounting together and thus to hold the fruit cup inwardly toward the center line of the machine. The outer section 57 is also provided with a roller 67 mounted on a finger 68. The purpose and functioning of the rollers 60 and 67 and of the slidable connection between the inner and outer sections of the fruit cup mounting are explained hereinafter.

Peach halves 75 are deposited manually in the fruit cups at the loading station A and travel forwardly for a topping operation to be performed at the topping station B. At this station there is provided a topping cutter generally designated as 76. It will be understood that there are two such topping cutters, one on each side of the machine, which are identical in structure and function but oppositely disposed.

Figure 4:
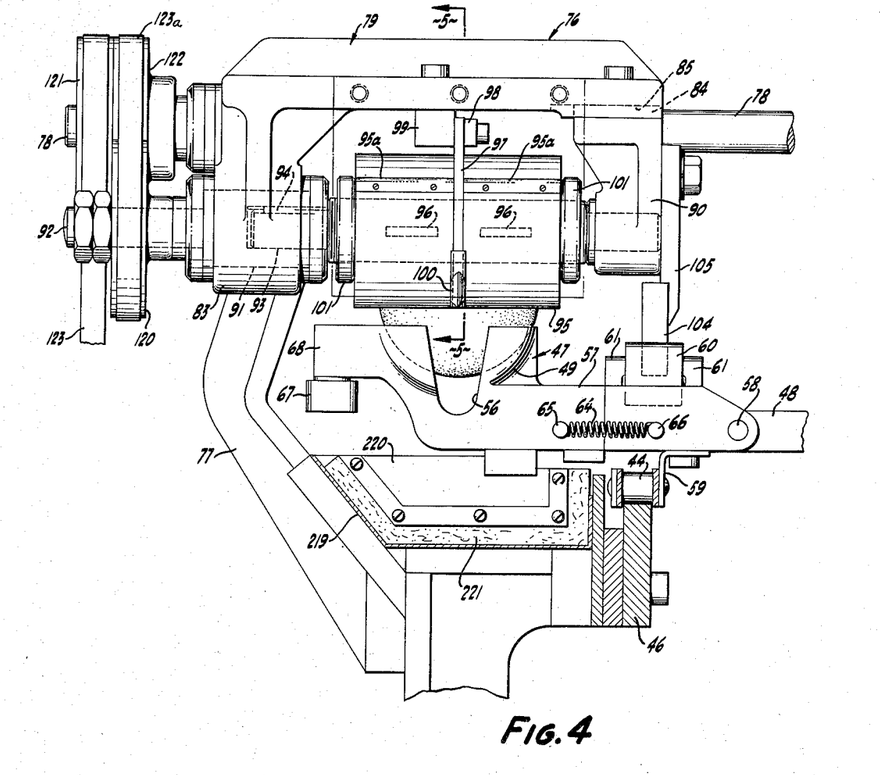
Fig. 4 is a vertical, transverse section taken along the line 4—4 of Fig. 3, showing the topping cutter assembly in end elevation.
Figure 5:
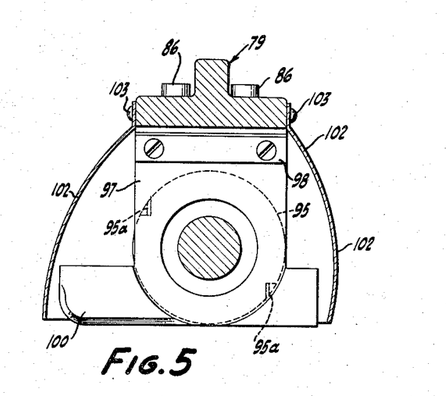
Fig. 5 is a section taken along the line 5—5 of Fig. 4, showing certain details of the topping cutter assembly.

Referring more particularly to Figs. 3, 4 and 5, a topping cutter support bracket 77, secured at its lower end to the main framework of the machine, carries, at its upper end one end of a countershaft 78 which is suitably journaled therein. The other end of the countershaft 78 is journaled in a similar bracket on the opposite side of the machine. An L-shaped arm 79 is pivotally supported by a sleeve 80 upon the countershaft 78. An arm 81 extending laterally from the main bracket 77 is provided at its outer end with an adjustable stop screw and nut 82 which serve to limit the downward pivotal movement of the arm 79.

Depending from and integral with the arm 79, at the angle of the L, is a main bearing 83, and secured to the arm 79 at its inner end, by means of a key 84, a keyway 85 and cap screws 86, is a removable outboard bearing 90. Journaled in the main bearing 83 is a main spindle 91, to which is secured a shaft 92. One end of a removable arbor 93 is keyed to the main spindle at 94 and, at its opposite end, is journaled in the removable outboard bearing 90. A pair of cylindrical cutting knives 95 of known construction and having cutting blades 95a, are keyed to the arbor 93 at 96 and therebetween is disposed a fixed shoulder 97 adjustably secured at 98 to a bracket 99 secured to the arm 79. At its lower end, the fixed shoulder 97 carries a depth gauge 100, which functions to gauge the depth of the topping cut. Ring nuts 101 secure the knives 95 in place upon the arbor 93. As shown more clearly in Fig. 5, guards 102 are provided, being secured to the arm 79 at 103, and as shown most clearly in Figs. 3 and 4, a cam 104 is also provided, being secured to a bracket 105 bolted to the outboard bearing 90 and being provided with lobes 106 and 107 and with an intermediate recessed area 108.

To rotate the shaft 92, and with it the spindle 91, arbor 93 and knives 95, a pulley 120 is secured to the shaft 92 and pulleys 121 and 122 to the countershaft 78. A V-belt 123 is trained about the pulley 121 and the pulley 14 on the motor extension shaft 13 and another V-belt 123a is trained about the pulleys 120 and 122. It will be seen that, as the motor 10 is operated, the upper course of the conveyor chains 44, and with them the fruit cups 49, will move from the left end to the right end of the machine as viewed in Fig. 1. As a roller 60 contacts the first lobe 106 of the cam 104, it will pivot the topping cutter 76 and its arm 79 on the countershaft 78, thus causing the topping cutter to clear the fruit while the same is being brought into proper alignment with the cutting knives 95. After the roller passes the lobe 106, the topping cutter will pivot downwardly to bring the knives 95 into appropriate position for cutting the fruit. The depth gauge 100, which will have been adjusted previously, will gauge the depth of cutting of the fruit. As will be seen in Fig. 4, the depth gauge is located directly over the center of the fruit and thus bears against the pit of the fruit. By appropriate adjustment of the gauge, the depth of cut can be regulated to any desired degree, preferably down to the level of the pit. The rotating cylindrical cutters function to remove any meat overlying the pit so as to condition the fruit properly for the subsequent pitting operation. As the fruit cup moves forwardly, the roller 60 will contact the second lobe 107 of the cam 104, thus pivoting the cutter upwardly to clear it from the fruit and allow the fruit to pass forwardly to the pitting station.

Referring more particularly to Figs. 1, 2 and 3, each of two identical but oppositely disposed pitting units 125 comprises a pitter head 126 rotatably mounted on a shaft 127 to the ends of which are clamped arms 128 of a yoke 129. The opposite ends of the arms 128 are pivotally mounted upon a single countershaft 130, which is journaled in bearing blocks 131 mounted on frame brackets 132 which, in turn, are secured to the main framework of the machine. The pitter head 126 is rotated by the main conveyor shaft 35 through the medium of a sprocket 133 affixed thereto, sprockets 134 and 135 secured to the countershaft 130 and a sprocket 136 secured to the pitter head shaft 127. Two idler sprockets 137 are provided, each carried on a stub shaft 138 journaled in a bracket 139 secured to the machine framework, and a chain 140 trained over the idler sprockets 137 and over the main countershaft sprocket 134 is in mesh with the conveyor shaft sprocket 133. A chain 141 is trained over the sprockets 135 and 136.

The pitter head 126 comprises a main casting 149 having four lobes 150 disposed at 90° with respect to one another and each having a roller 151 for a purpose described hereinafter. As shown more clearly in Fig. 6, the casting 149 is mounted upon a bushing 152 secured to the pitter head shaft 127, and a driving connection between the sprocket 136 and the casting 149 is provided as follows. A cam 153 is secured to the sprocket 136 by means of countersunk cap screws 154. A pin 155 received within a socket 156 formed in the casting has one end in a recess 157 formed in the cam (see also Fig. 13), wherein it bears against one end of a coil spring 158, the opposite end of which bears against the other end of the recess 157. The driving connection thus provided between the sprockets 136 and the pitter head casting 126 provides a form of release clutch, the purpose of which is described and explained hereinafter.

Figure 13:
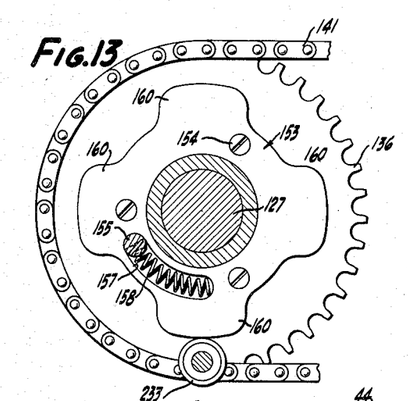
Fig. 13 is a section along the line 13—13 of Fig. 6 showing the cam for pivoting the pitter head and also showing a release clutch embodied in the cam.

As will be seen from Fig. 13, the cam 153 is provided with four lobes 160 spaced equi-angularly about the axis of the pitter head shaft. At the opposite or inner end of the pitter head shaft, and secured thereto, is a stationary contour cam 161, this cam being provided with a rise or high dwell 162 of circular radius, a shoulder 163 and a low point 164 (see Fig. 3).

Figure 6:
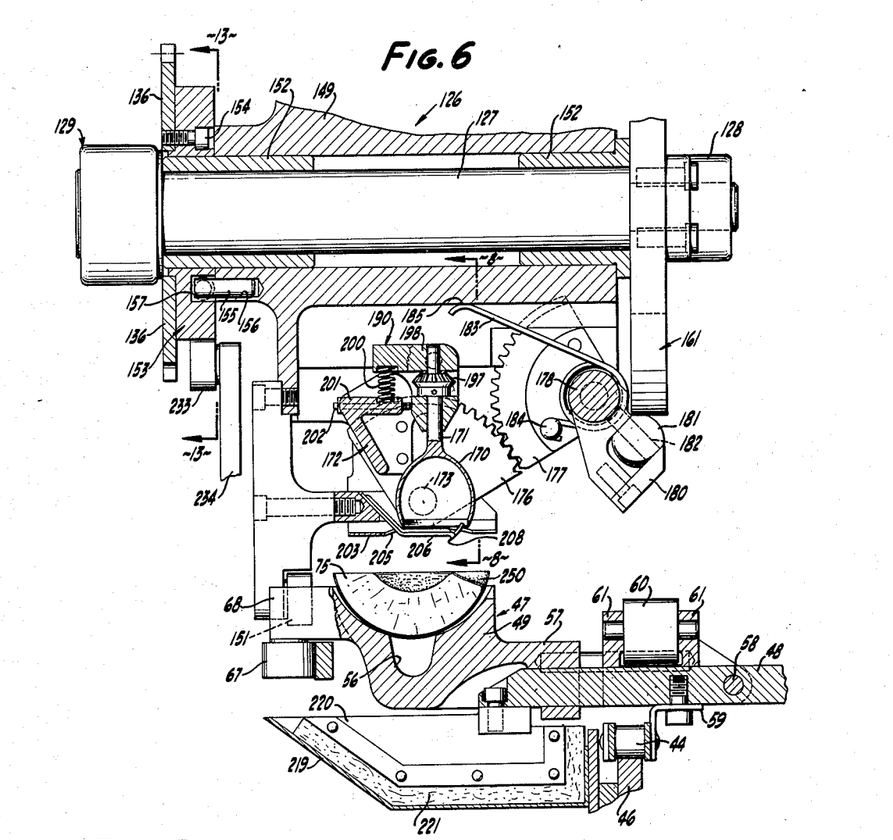
Fig. 6 is a vertical mid-section taken along the line 6—6 of Fig. 3, showing details of the pitter head assembly and showing the pitting knife in its initial, vertical position before commencing the pitting cut.
Figures 7, 8, 9, 10:
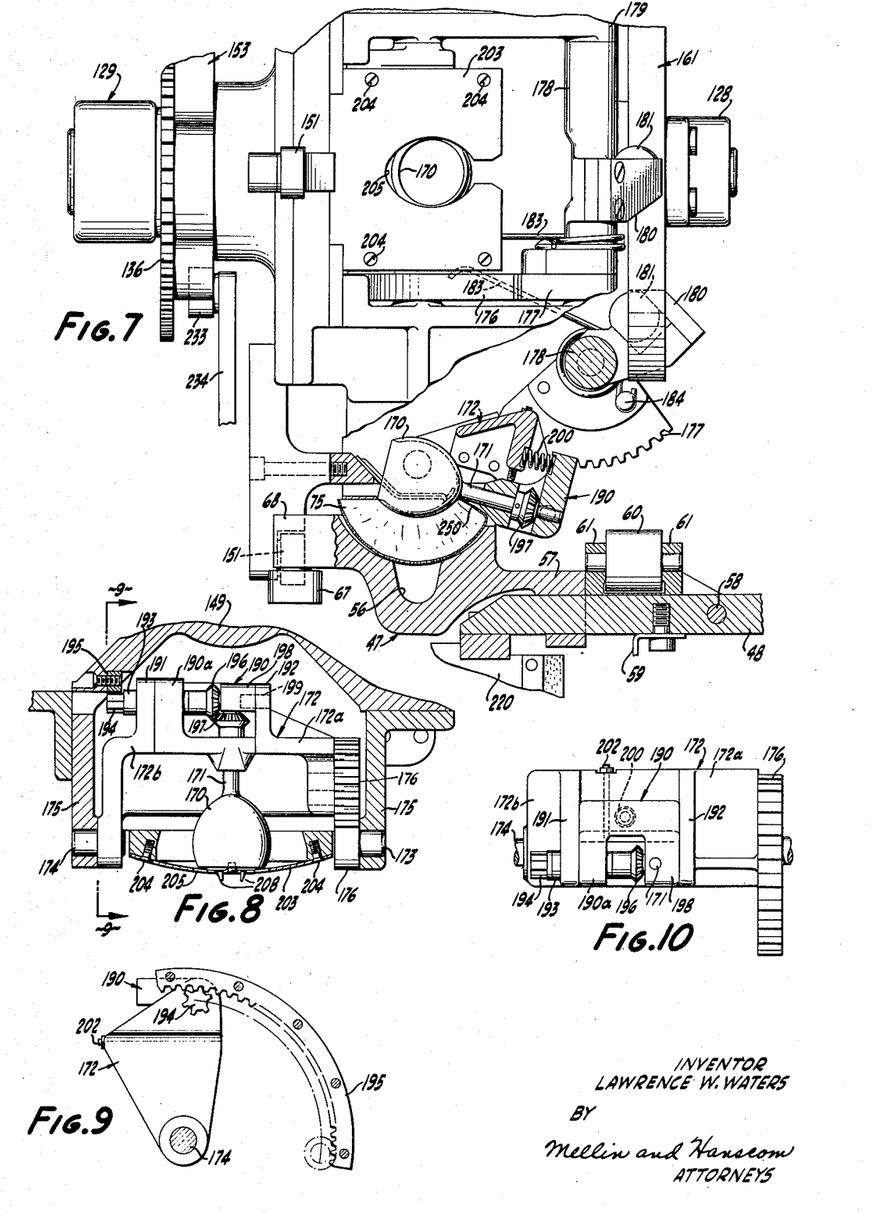
Fig. 7 is a view similar to that of Fig. 6 but showing certain parts in elevation and also showing the pitting knife in a different position.
Fig. 8 is a fragmentary, sectional view taken along the line 8—8 of Fig. 6, showing certain details of the pitting knife and of the means for actuating the same.
Fig. 9 is a section taken along the line 9—9 of Fig. 8, showing the pinion and the radial rack means for rotating the pitting knife about the axis of its spindle.
Fig. 10 is a plan view of the pitting knife unit.

As shown more clearly in Fig. 8, a rotary pitting unit is provided in each lobe 150 of the casting 149, comprising a bowl shaped rotary pitter knife 170 secured to a spindle shaft 171 journaled in a yoke 172. Stub shafts 173 and 174 integral with the yoke 172 are journaled in arms 175 of the pitter head casting. A quadrant gear 176 is secured to the stub shaft 173 and meshes with another quadrant gear 177 secured to a shaft 178 journaled in a bracket 179 integral with the pitter head casting. Also secured to the shaft 178 is a U-shaped pivot arm 180 and a roller 181 is mounted on a shaft 182 between the legs of the U. A spring 183 is provided which is coiled about the shaft 178 and is secured at 184 to the quadrant gear 177 and bears, at its other end, against the pitter head casting at 185, as shown in Fig. 6. As described in detail hereinafter, the quadrant gears 176 and 177 and the spring 183 serve to rock the pitter knife unit from a vertical position as shown in Fig. 6 through an angle greater than 90° to the inclined position shown in Fig. 7.

The pitter knife 170 is also mounted for rotation about the axis of its spindle 171, and means are provided for imparting such rotation to the pitter knife. As will be seen in Fig. 8, the yoke 172 comprises outer segments 172a and 172b, which are journaled in the pitter head casting as described above, and an inner segment 190, the spindle 171 being journaled in the inner segment 190. The inner segment 190 is rotatably supported between brackets 191 and 192 extending upwardly from outer yoke segments 172a and 172b, by means of a shaft 193 journaled in the bracket 191 and extending through and secured to a bearing bracket 190a extending upwardly from the segment 190. At its outer end, the shaft 193 is provided with a pinion 194 which meshes with a radial rack 195 bolted to the pitter head casting. At its inner end, the shaft 193 is provided with a bevel gear 196 meshing with a bevel gear 197 carried on the spindle 171. The upper end of the spindle is journaled in a bearing 198 which is rotatably supported upon a pin 199 secured to the bracket 192. As shown most clearly in Fig. 6, the angular position of the spindle 171 and knife 170 is adjustable by means of coil spring 200 compressed between the bearing 198 and a bracket 201 bolted to the quadrant gear 176, and a stop screw 202 in threaded engagement with the bracket 201.

A plate 203 is also provided, being suitably bolted to the pitter head casting as at 204 and having an opening 205 formed therein to receive the pitter knife 170. Also provided are pit locaters 206 suitably secured to the pitter head casting, and having locater points 208. The plate 203 is best seen in Fig. 7 and the pit locater in Fig. 6.

It will be seen that, as the pitter head 126 is rotated upon the shaft 127, the rollers 181 will, in sequence, ride up the low point 164 of the contour cam 161. As each roller 181 rides up the low point 164 to the high dwell or circular section 162 of the cam, the shaft 178 associated with such roller will be rotated clockwise as viewed in Fig. 6, thus rotating the quadrant gear 177 clockwise, loading the spring 183 and rotating the quadrant gear 176 counter-clockwise. Thus, the spring 183 is loaded and the rotary pitter knife 170 is aligned vertically. When the roller 181 rides off the shoulder 163 of the cam 161, tension is released on the spring 183, which rotates the shaft 178 and quadrant gears 177 and 176 in the opposite direction. This results in rotating the pitter knife through more than 90° to the position shown in Fig. 7. Such movement of the pitter knife is effective in cutting the pit free from the meat and in scooping it out of the fruit. As the knife is returned to vertical position by further angular movement of the pitter head, the pit drops out of the knife into a slop trough described hereinafter.

Meanwhile, as the pitter knife is rotated from vertical to below horizontal position, the pinion 194 engaging rack 195 causes the pitter knife, through the medium of shaft 193 and bevel gears 196 and 197, to rotate about its spindle axis. Also, since the pitter knife is rotatably supported between the outer segments 172a and 172b of the yoke 172, and is held yieldably in a predetermined position with respect to the yoke by means of spring 200 and stop screw 202, the pitter knife is free to assume any angular position and thus to accommodate itself to pits of varying size, shape and degree of roughness.

The machine is further provided with a slop trough 219 secured to the main framework and underlying the upper course of each conveyor chain 44, and wipers 220 are also provided for each half of the machine, each wiper being secured to and depending from a fruit cup mounting 57 and including a leather strip 221. Pit deflectors 222 are also provided, one for each half of the machine and secured to a frame bracket 132. A pan 223 is also provided, and a chute 224 leads from the forward or right-hand end (as viewed in Fig. 1) of each slop trough 219 to the pan 223. A chute 225 is provided for draining the pan 223. At the right-hand or unloading end of the machine, a pair of curved guide fingers 226 are provided, one for each half of the machine. Each guide finger 226 is so disposed that, as a fruit cup 49 containing a pitted fruit 75 moves downwardly, the finger 226 is received in the channel 56 formed in the fruit cup and underneath the fruit, and the finger 226 has, at 227, a curvature such that as the fruit cup continues on its downward path, the fruit bears against the finger with increasing pressure and is thus ejected from the cup. Any suitable equipment, such as a ramp 228 and a conveyor belt 229 carried on a roller 230, may be provided to receive the pitted fruit and carry it away.

In operation, fruit is loaded at A and is topped at B, as described hereinabove, and continues forwardly to the pitting station C. By timed rotation of the pitter head 126 about the shaft 127, a pitting unit is brought into pitting position as a fruit cup is brought into alignment with the pitter head. As described hereinabove, the pitter knife 170 is rotated from vertical position through somewhat more than 90° and back again to vertical position, and is also rotated about its spindle axis, in properly timed relation to travel of the fruit cups, so as to make the pitting cut, scoop out the pit and drop it upon the pit deflector 222, which deflects the pit into the slop trough 219 or chute 224. As shown in Fig. 7, the pitter knife is rotated to a position wherein it is inclined upwardly from the spindle 171 to the knife 170, and when in this position the spindle 171 lies in the stem groove 250 of the fruit with the tip of the knife protruding above the level of the fruit. The pit is thus completely and cleanly severed from the fruit. During the cutting operation, the plate 203 rests on the surface of the fruit, holding it level and steady. The locater points 208 serve also to hold the pit and fruit in position and as a guide for the knife 170 during its initial downward movement. Thereafter, the pit itself serves as a guide for guiding the knife and as a gauge for gauging the depth of cut.

To provide for clearance and for presentation of the fruit to the pitting knife at the proper moment in its sequence of movements, each fruit cup 49 is first moved away from the center line of the machine and then toward the center line. This is accomplished by means of a cam 231 secured to the machine framework on each side thereof and somewhat in advance of the pitting station. The cam 231 has a diagonal section 232 which, as is best shown in Fig. 11, deflects the roller 67, and with it moves the fruit cup 49, away from the center line of the machine. As the roller rides off the forward end of the cam, the springs 64 draw the fruit cup back toward the center line of the machine and in alignment with the pitter knife.

Between pitting cuts, the entire pitter head is pivoted upwardly on the countershaft 130, by means of a roller 233 mounted on a bracket 234 adjustably secured at 235 to a frame bracket 236. As a lobe 160 of the cam 153 (see Fig. 13) contacts the roller 233, the pitter head is caused to pivot upwardly, the lobes 160 being so designed and disposed as to lift the pitter head after the pitting cut has been accomplished and to return the pitter head to pitting position for the next pitting cut.

Provision is also made for accelerating the rotary movements of the pitter knife 170 during the pitting operation. This is accomplished by means of the rollers 151 on the pitter head casting 149 and the fingers 68 on the fruit cup mountings 57. The fingers 68 and the rollers 151 are so disposed that a finger 68 contacts a roller 151 at the commencement of a pitting cut. Further forward, linear motion of the finger 68 accelerates the angular motion of the pitter head, hence the rotary speed of the shaft 178 and quadrant gears 176 and 177 and the rotary motions of the pitter knife 170. Such acceleration is made possible by reason of the relief clutch embodied in the cam 153 and pitter head casting 149 and described hereinabove.

Figure 15:
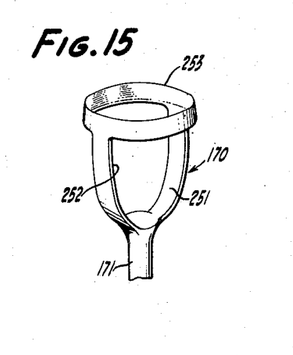
Fig. 15 is a perspective view of a modified form of pitting knife.

Referring now to Fig. 15, there is shown an alternative form of cutting knife 170. This form of knife, instead of having solid walls as shown in the other figures, is of open construction, having arms 251 and 252 and a cutting edge or rim 253 as shown. This form of knife is advantageous in that it drops the severed pit more readily, as well as for other reasons.

It will thus be seen that a machine has been provided which efficiently and rapidly pits fruit halves, such as peach halves containing split pits. The machine embodies several advantageous features, such as an efficient topping unit; a pitting unit embodying features that ensure accurate alignment of the fruit and pitting knife and rapid, clean removal of the pit, proper timing of the several operations, etc.

While I have shown the preferred form of my invention, it is to be understood that various changes may be made in its construction by those skilled in the art without departing from the spirit of the invention as defined in the appended claims.

Having thus described my invention, what I claim and desire to obtain by Letters Patent is:

1. A pitting machine comprising a pitter head supported for rotation, a plurality of pitting units carried by said pitter head and disposed radially about the rotary axis thereof, each said pitting unit comprising a pitting knife and a pitting knife support, said knife being rotatable in said knife support and said knife support being oscillatable in said pitter head, the rotary and oscillatory axes of said knife and knife support being mutually perpendicular, means for oscillating each said knife support in said pitter head and means for simultaneously rotating each said knife in said knife support, said oscillating and rotating means being operable when a pitting unit is in a predetermined rotary position and also being operable to oscillate said knife support through an angle of approximately 90 degrees.

2. A pitting machine comprising a pitter head supported for rotation, at least one pitting unit carried by said pitter head and comprising a pitting knife support and a pitting knife, said knife being rotatable in said knife support and said knife support being oscillatable in said pitter head, the rotary and oscillatory axes of said knife and knife support being mutually perpendicular, and cam means actuated by rotation of said pitter head for simultaneously rotating said knife and oscillating said knife support.

3. A pitting machine comprising a pitter head, a pivotal support for said pitter head, said pitter head being rotatable in said pivotal support, a plurality of pitting units carried by and disposed radially about the rotary axis of said pitter head, each said pitting unit comprising a pitting knife having a spindle and supported for rotation about its spindle axis and for oscillation of the knife and spindle about an axis perpendicular to said spindle axis, means actuated by rotation of said pitter head for rotating said knife about its spindle axis and simultaneously oscillating said knife and spindle about said perpendicular axis, and means for periodically pivoting said pitter head on its pivotal support.

4. A fruit topping machine comprising a topping unit including a rotary knife supported for rotation about a rotary axis and for pivoting about a pivotal axis, a continuous fruit conveyor, means for rotating said knife about its rotary axis, a cam having forward and rearward lobes and an intermediate recessed portion affixed to said topping unit, and a plurality of spaced cam followers affixed to said conveyor, said cam and cam followers being so disposed as to pivot said knife to clear each fruit upon approach and exit thereof to and from said knife, and to pivot said knife to cutting position when each fruit is in alignment therewith.

5. A rotary cutter comprising a main framework, a continuous conveyor supported by said framework and having a plurality of spaced members secured thereto adapted to hold fruit or the like, an arm pivotally supported above said conveyor, a shaft supported by said arm for rotation therein, a rotary cutter blade supported by said shaft for rotation therewith, a cam supported by said arm and spaced cam followers secured to said conveyor, said cam and cam followers being so disposed as to oscillate said arm about its pivotal axis in timed relation to movement of said conveyor to clear said blade of said fruit holding members as each such member approaches and leaves a cutting position and to present said blade to each said member when at a cutting position.

6. A pitting machine comprising a rotatable pitter head having at least one pitter unit comprising a pitting knife support and a pitting knife, said knife being rotatably supported by said knife support and said knife support being rockably supported by said pitter head, the rotary axes of said knife and knife support being mutually perpendicular; and means for simultaneously rotating the knife and rocking the knife support to make a pitting cut and to scoop out the severed pit, said means comprising a stationary cam, a cam follower for said cam and a rotatable shaft fixed to said follower, and transmission means operatively connecting said shaft with the knife and knife support to simultaneously rotate the knife and rock the knife support.

7. A pitting machine comprising a rotatable pitter head having at least one pitter unit comprising a pitting knife support and a pitting knife, said knife being rotatably supported by said knife support and said knife support being supported on said pitter head for oscillatory movement so as to allow simultaneous spinning of the knife and oscillation of the knife support to make a pitting cut and scoop out the severed pit and then return to a rest position; and means for effecting said spinning and oscillatory movements comprising a stationary cam, a cam follower oscillated by the cam, a shaft operated by the cam follower to oscillate therewith, and transmission means operatively connecting the shaft with the knife support and knife to oscillate the knife support and spin the knife.

8. A fruit trimming and topping machine adapted to trim and top a peach half, comprising a continuous conveyor, fruit holding means carried by the conveyor in spaced relationship and each adapted to hold a peach half with its base exposed, a rotary blade adapted to engage and trim the entire exposed surface of a peach half, means pivotally mounting said blade at a trimming station for rotation about an axis parallel and transverse to the conveyor and allowing oscillation of said axis toward and away from the conveyor, and cam means operated by travel of the conveyor for oscillating said blade to rock it away from the conveyor as each fruit approaches the trimming station, to rock it toward the conveyor to trim and top the fruit when at said station and to rock the blade away from the conveyor as the fruit leaves the trimming station.

LAWRENCE W. WATERS.

REFERENCES CITED

The following references are of record in the file of this patent:

UNITED STATES PATENTS

| Number | Name | Date |
|---|---|---|
| 1,512,410 | Eldridge | Oct. 21, 1924 |
| 1,901,042 | Robbins | Mar. 14, 1933 |

FOREIGN PATENTS

| Number | Country | Date |
|---|---|---|
| 6,169 of 1932 | Australia | Feb. 23, 1933 |
| 112,634 | Australia | Mar. 13, 1941 |
| 118,606 | Australia | June 22, 1944 |